US010393232B2

(12) United States Patent
Webert et al.

(10) Patent No.: US 10,393,232 B2
(45) Date of Patent: Aug. 27, 2019

(54) TRANSMISSION WITH COLD SHIFT DELAY MITIGATION

(71) Applicant: GM Global Technology Operations LLC, Detroit, MI (US)

(72) Inventors: David C. Webert, Milford, MI (US); Todd R. Berger, Pinckney, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 252 days.

(21) Appl. No.: 15/596,498

(22) Filed: May 16, 2017

(65) Prior Publication Data

US 2018/0335133 A1 Nov. 22, 2018

(51) Int. Cl.

*F16H 3/66* (2006.01)
*F16H 61/00* (2006.01)
*F16H 63/48* (2006.01)
*F16H 59/72* (2006.01)

(52) U.S. Cl.

CPC ........... *F16H 3/66* (2013.01); *F16H 61/0059* (2013.01); *F16H 63/48* (2013.01); *F16H 63/486* (2013.01); *F16H 59/72* (2013.01); *F16H 2200/0065* (2013.01); *F16H 2200/201* (2013.01); *F16H 2200/2048* (2013.01); *F16H 2200/2066* (2013.01); *F16H 2200/2082* (2013.01)

(58) Field of Classification Search

CPC .. F16H 59/64; F16H 59/72; F16H 2059/6823; F16H 3/66; F16H 2200/0065; F16H 2200/2046; F16H 2200/2066; F16H 2200/2082; F16H 61/10; F16H 61/684; F16H 2061/0485; F16H 2061/0488; F16H 63/3416; F16H 63/3425; F16H 63/40

See application file for complete search history.

(56) References Cited

U.S. PATENT DOCUMENTS

| | | | | |
|---|---|---|---|---|
| 8,932,167 | B2 | 1/2015 | Berger et al. | |
| 8,968,154 | B2 * | 3/2015 | Chin | F04B 49/06 477/156 |
| 2006/0058154 | A1 * | 3/2006 | Heckel | F16H 59/72 477/97 |
| 2014/0364267 | A1 * | 12/2014 | Tachibanada | F16H 3/66 475/269 |
| 2017/0219082 | A1 * | 8/2017 | Solt | F16H 57/0413 |
| 2017/0297559 | A1 * | 10/2017 | Minamikawa | F16H 61/0204 |
| 2018/0283551 | A1 * | 10/2018 | Tachibanada | F16H 63/50 |

* cited by examiner

*Primary Examiner* — Charles A Fox
*Assistant Examiner* — Lori Wu

(57) ABSTRACT

A method of operating a motor vehicle transmission includes measuring an operating temperature of the transmission, the transmission having at least seven torque transmitting mechanisms and at least three planetary gear sets, each planetary gear set having three gear members; determining if the transmission is in a park mode; determining if the operating temperature is below a predetermined threshold; if the operating temperature is below the predetermined threshold and the transmission is the park mode, implementing a shift delay mitigation process that includes engaging a fourth torque transmitting mechanism and a firth torque transmitting mechanism of the at least seven torque transmitting mechanisms so that they are locked to a ground to prevent a first gear member of the first planetary gear set from moving, which, in turn, prevents an input torque being transferred to a park pawl.

18 Claims, 3 Drawing Sheets

| | | | | | | | |
|---|---|---|---|---|---|---|---|
| | 80 | 44 | 72 | 46 | 28 | 24 | 68 |
| P | | | | | | | X |
| R | | | | | | | X |
| 1 | X | | | | | | X |
| 2 | X | X | | | | | |
| 3 | X | | X | | | | |
| 4 | X | | | X | | | |
| 5 | X | | | | X | | |
| 6 | X | | | | | X | |
| 7 | | | | | X | X | |
| 8 | | | X | | | X | |
| 9 | | X | | | | X | |

TRANSMISSION WITH COLD SHIFT DELAY MITIGATION

INTRODUCTION

The present disclosure relates to a motor vehicle transmission. More specifically, the present disclosure relates to a motor vehicle transmission that mitigates out of park shift delays in cold environments.

A typical automatic transmission includes a hydraulic control system that is utilized to actuate a plurality of torque transmitting mechanisms. These torque transmitting mechanisms may be, for example, clutches and brakes arranged with a plurality of gear sets. The torque transmitting mechanisms are selectively engaged to obtain different gear ratios.

The hydraulic control system typically pumps pressurized fluid to a plurality of valves and solenoids that are operable to direct the pressurized fluid to various subsystems, such as, an electronic transmission range selection (ETRS) that is employed to shift the transmission to a reverse mode or to a drive mode. During extremely cold operating conditions, shifting the transmission out of park to the reverse mode or drive mode may result in significant delays before the transmission actually engages the reverse mode or drive mode because of hydraulic lag issues.

Thus, while current transmission control systems achieve their intended purpose, there is a need for a new and improved system and method for mitigating delays in out of park shifting in cold environments.

SUMMARY

According to several aspects, a method of operating a motor vehicle transmission includes measuring an operating temperature of the transmission, the transmission having at least seven torque transmitting mechanisms and at least three planetary gear sets, each planetary gear set having three gear members; determining if the transmission is in a park mode; determining if the operating temperature is below a predetermined threshold; if the operating temperature is below the predetermined threshold and the transmission is the park mode, implementing a shift delay mitigation process that includes engaging a fourth torque transmitting mechanism and a fifth torque transmitting mechanism of the at least seven torque transmitting mechanisms so that they are locked to a ground to prevent a first gear member of the first planetary gear set from moving, the first gear member of the first planetary get set being coupled to an output drive shaft to prevent an input torque being transferred to a park pawl; and shifting the transmission out of the park mode.

In an additional aspect of the present disclosure, the first gear member of the first planetary gear set is coupled to a third gear member of the first planetary gear set, the third gear member being selectively coupled to the ground by the fourth torque transmitting mechanism.

In another aspect of the present disclosure, the fourth and fifth torque transmitting mechanisms are clutches.

In another aspect of the present disclosure, the fifth torque transmitting mechanism is a selectable one-way clutch.

In another aspect of the present disclosure, the output drive shaft is coupled to a first gear member of the second planetary gear set.

In another aspect of the present disclosure, the first gear member of the second planetary gear set is a ring gear.

In another aspect of the present disclosure, when the fifth torque transmitting mechanism is engaged, a second gear member of the second planetary gear set is coupled with a first gear member of the third planetary gear set.

In another aspect of the present disclosure, the second gear member of the second planetary gear set is a planet gear carrier and the first gear member of the third planetary gear set is a ring gear.

In another aspect of the present disclosure, the first gear member of the first planetary gear set is a ring gear.

According to several aspects, method of operating a motor vehicle transmission includes measuring an operating temperature of the transmission, the transmission having at least seven torque transmitting mechanisms and at least three planetary gear sets, each planetary gear set having three gear members; determining if the transmission is in a park mode; determining if the operating temperature is below a predetermined threshold; if the operating temperature is below the predetermined threshold and the transmission is the park mode, implementing a shift delay mitigation process that includes engaging a fourth torque transmitting mechanism and a fifth torque transmitting mechanism of the at least seven torque transmitting mechanisms so that they are locked to a ground to prevent a first gear member of the first planetary gear set from moving, the first gear member of the first planetary get set being coupled to an output drive shaft to prevent an input torque being transferred to a park pawl, the first gear member of the first planetary gear set being coupled to a third gear member of the first planetary gear set, the third gear member being selectively coupled to the ground by the fourth torque transmitting mechanism; shifting the transmission out of the park mode; determining if the transmission is out of the park mode; and if the transmission is out of the park mode, disengaging the fourth torque transmitting mechanism from the ground.

In an additional aspect of the present disclosure, the fourth and fifth torque transmitting mechanisms are clutches.

In another aspect of the present disclosure, the fifth torque transmitting mechanism is a selectable one-way clutch.

In another aspect of the present disclosure, the output drive shaft is coupled to a first gear member of the second planetary gear set.

In another aspect of the present disclosure, the first gear member of the second planetary gear set is a ring gear.

In another aspect of the present disclosure, when the fifth torque transmitting mechanism is engaged, a second gear member of the second planetary gear set is coupled with a first gear member of the third planetary gear set.

In another aspect of the present disclosure, the second gear member of the second planetary gear set is a planet gear carrier and the first gear member of the third planetary gear set is a ring gear.

In another aspect of the present disclosure, the first gear member of the first planetary gear set is a ring gear.

According to several aspects, a method of operating a motor vehicle transmission includes measuring an operating temperature of the transmission, the transmission having at least seven clutches and at least three planetary gear sets, each planetary gear set having a ring gear, a planet gear carrier and a sun gear; determining if the transmission is in a park mode; determining if the operating temperature is below a predetermined threshold; if the operating temperature is below the predetermined threshold and the transmission is the park mode, implementing a shift delay mitigation process that includes engaging a clutch and a selectable one-way clutch of the at least seven clutches so that they are locked to a ground to prevent the ring gear of the first planetary gear set from moving, the ring gear of the first planetary get set being coupled to an output drive shaft to prevent an input torque being transferred to a park pawl, the ring gear of the first planetary gear set being coupled to the sun gear of the first planetary gear set, the sun gear of the first planetary gear set being selectively coupled to the ground by the clutch; shifting the transmission out of the park mode; determining if the transmission is out of the park mode; and if the transmission is out of the park mode, disengaging the clutch from the ground.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
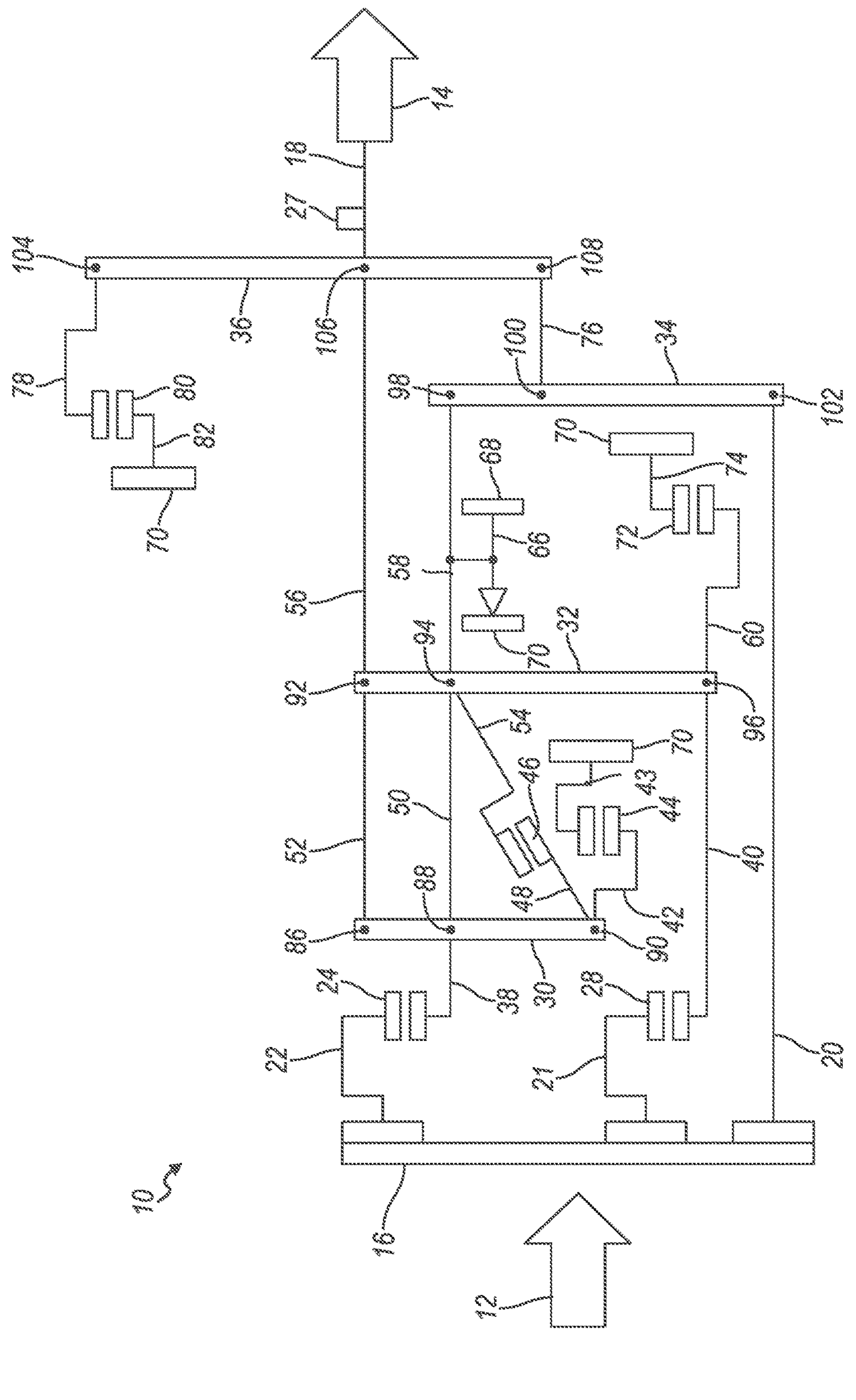
FIG. 1 is a lever diagram of a motor vehicle transmission in accordance with the principles of the present invention.

Referring now to FIG. 1, an embodiment of a motor vehicle transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. Mechanical couplings or interconnections between the nodes of the various planetary gear sets are illustrated by thin lines. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 16, a first planetary gear set 30 having three nodes: a first node 86, a second node 88 and a third node 90, a second planetary gear set 32 having three nodes: a first node 92, a second node 94 and a third node 96, a third planetary gear set 34 having three nodes: a first node 98, a second node 100 and a third node 102, and a fourth planetary gear set 36 having three nodes: a first node 104, a second node 106 and a third node 108, and an output member or drive shaft 18. A park pawl 27 selectively couples with the drive shaft 18. During the operation of the transmission 10, an input torque 12 is selectively transmitted as an output 14 to a set of drive wheels of the motor vehicle. In certain arrangements, the first node 86, the second node 88 and the third node 90 of the first planetary gear set 30 are a ring gear 86, a planet gear carrier with a set of planet gears 88 and a sun gear 90, respectively; the first node 92, the second node 94 and the third node 96 of the second planetary gear set 32 are a ring gear 92, a planet gear carrier with a set of planet gears 94 and a sun gear 96, respectively; the first node 98, the second node 100 and the third node 102 of the third planetary gear set 34 are a ring gear 98, a planet gear carrier with a set of planet gears 100 and a sun gear 102, respectively; and the first node 104, the second node 106 and the third node 108 of the fourth planetary gear set 36 are a sun gear 104, a planet gear carrier with a set of planet gears 106 and a ring gear 108, respectively A first torque transmitting mechanism 24 selectively connects the input member 16 to the second node 88 of the first planetary gear set 30 with a first interconnecting member 22 and a second interconnecting member 38. A second torque transmitting mechanism 28 selectively connects the input member 16 to the third node 96 of the second planetary gear set 32 with a third interconnecting member 21 and a fourth interconnecting member 40. A fifth interconnecting member 20 connects the input member 16 to the third node 102 of the third planetary gear set 34.

A sixth interconnecting member 52 connects the first node 86 of the first planetary gear set 30 with the first node 92 of the second planetary gear set 32. A seventh interconnecting member 50 connects the second node 88 of the first planetary gear set 30 with a second node 94 of the second planetary gear set 32. A third torque transmitting mechanism 46 selectively connects the third node 90 of the first planetary gear set 30 to the second node 94 of the second planetary gear set 32 with an eighth interconnecting member 48 and a ninth interconnecting member 54. A fourth torque transmitting mechanism 44 selectively connects the third node 90 of the first planetary gear set 30 to a ground 70, such as, for example, a housing of the transmission 10, with a tenth interconnecting member 42 and an eleventh interconnecting member 43.

A fifth torque transmitting mechanism 68 selectively connects the second node 94 of the second planetary gear set 94 and the first node 98 of the third planetary gear set 34 to the ground 70 with a twelfth interconnecting member 58 and a thirteenth interconnecting member 66.

A sixth torque transmitting mechanism 72 selectively connects the third node 96 of the second planetary gear set 32 to the ground 70 with a fourteenth interconnecting member 60 and a fifteenth interconnecting member 74. A seventh torque transmitting mechanism 80 connects the first node 104 of the fourth planetary gear set 36 to the ground 70 with a sixteenth interconnecting member 78 and a seventeenth interconnecting member 82. An eighteenth interconnecting member 76 connects the second node 100 of the third planetary gear set 34 to the third node 108 of the fourth planetary gear set 36.

In various arrangements, the first torque transmitting mechanism 24, the second torque transmitting mechanism 28, the third torque transmitting mechanism 46, the fourth torque transmitting mechanism 44, the fifth torque transmitting mechanism 68, the sixth torque transmitting mechanism 72 and the seventh torque transmitting mechanism 80 are clutches, and in other arrangements, one or more are brakes. In certain arrangements, the fifth torque transmitting mechanism 68 is a selectable one-way clutch.

The transmission 10 is implemented with a hydraulic control system with pressurized hydraulic fluid that communicates with an electronic transmission range selection (ETRS) subsystem. The ETRS is utilized to select the desired range, for example, Park, Reverse and Drive, for the operation of the motor vehicle. The ETRS includes, along with other components, a plurality of valves and solenoids. The plurality of valves and solenoids includes a park servo valve that is coupled to a park mechanism, such as, the park pawl 27 to mechanically engage or disengage the park pawl 27. The park pawl 27 is also connected to an out-of-park solenoid that is actuatable to prevent the park pawl 27 from engaging during an engine stop-start event. The out-of-park solenoid may also be utilized to disengage the park servo valve when it is desirable to operate the motor vehicle in a reverse state or a forward drive state.

Figures 2, 3:
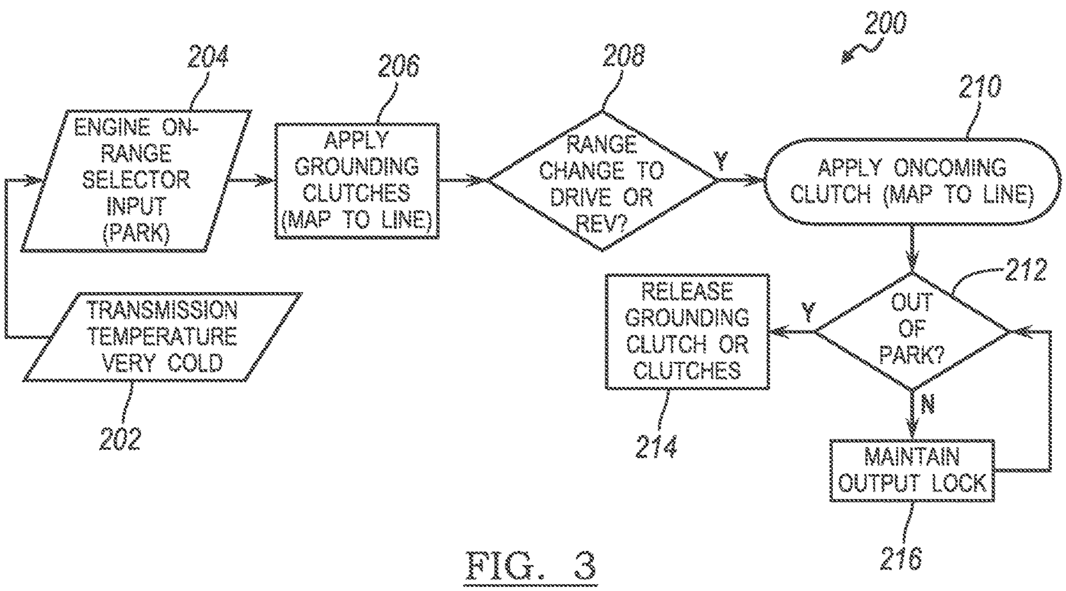
FIG. 2 is a truth table presenting the state of engagement of various torque transmitting mechanisms in each of the available forward and reverse speeds or gear ratios of the transmission illustrated in FIG. 1.
FIG. 3 is a flow diagram for operating the transmission illustrated in FIG. 1 in cold start environments.

Referring now to FIG. 2, the operation of the transmission 10 will be described. It will be appreciated that transmission 10 is capable of transmitting torque from the input member 16 to the output member 18 in at least nine forward speed or torque ratios and at least one reverse speed or torque ratio, as indicated by the vertical listing of the transmission range on the left side of the table Each forward and reverse speed or torque ratio is attained by engagement of one or more of the torque-transmitting mechanisms as listed horizontally along the top of the table (i.e., the torque transmitting mechanisms 80, 44, 72, 46, 28, 24 and 68). Hence, FIG. 2 is a truth table presenting the various combinations of torque-transmitting mechanisms that are activated or engaged to achieve the various gear states. An "X" in the box means that the particular torque transmitting mechanism is engaged to achieve the desired gear state. Various gear ratios are achievable depending on the gear diameter, gear teeth count and gear configuration selected.

To establish a reverse gear, for example, the fifth torque transmitting mechanism 68 is engaged or activated, and to establish a first forward gear, the seventh torque transmitting mechanism 80 is engaged or activated along with the fifth torque transmitting mechanism 68. Likewise, the other forward speed or gear states are achieved through different combinations of the torque transmitting mechanisms, as shown in FIG. 2.

Referring now to FIG. 3, a process 200 implemented in the ETRS to operate the transmission 10 with shift delay mitigation in cold operating environments. In a first step 202, the process 200 determines the operating temperature conditions of the transmission 10. If the operating temperature is extremely low, that is, below a predetermined threshold, for example, below −20° F., the process 200 moves on to a step 204 where the process 200 determines if the engine of the motor vehicle is operating and if the range selector of the transmission 10 is in the park mode. If so, the process 200 advances to a step 206 where the grounding torque transmitting members are activated or engaged, that is, the fourth torque transmitting mechanism 44 and the fifth torque transmitting mechanism 68 are engaged such that there are locked to the ground 70. As such, the first node or ring gear 86 of the first planetary gear set 30 is not able to move, which prevents the input torque 12 from being transmitted to the park pawl 27 such that it does not move and is locked in a neutral unloaded state.

Next, the process 200 determines in a step 208 if the driver has changed the range selector to a reverse state or a forward state. If the answer to the step 208 is yes, the process 200 moves on to a step 210 where the appropriate torque transmitting mechanisms are applied. For example, if the reverse state has been selected, the fifth torque transmitting mechanism 68 remains activated or engaged, and if the first forward state has been selected, the seventh torque transmitting mechanism 80 is activated or engaged as well. Next, the process 200 determines in a step 212 if the transmission 10 has been actually moved out of the park state. If the determination is no, the process 200 advances to a step 216 where the process 200 keeps the grounding torque transmitting mechanisms 44 and 68 activated or engaged such that they are locked to the ground 70. If the determination is yes, the process 200 moves to a step 214 where the appropriate ground torque transmitting mechanisms are released while allowing the park servo to release the park pawl 27. For example, if the range selector has been moved to the first gear state, the fourth torque transmitting mechanism 44 is released so that it is un-locked from the ground 70.

When the process 200 is utilized, the process 200 minimizes out of park shift delays associated with the cold operation of the transmission 10; that is, the delay associated from when the particular out of park range has been selected to when the transmission actually placed in the desired range. For example, without the utilization of the process 200, the cold shift delay may be as much as 5 to 6 seconds when the range selector of the transmission 10 has been moved out of park, but utilizing the process 200 may eliminate 2 to 3 seconds of the cold shift delay. Hence, implementing an electronic transmission range selection with the process 200 significantly improves the ability to execute quicker cold transmission temperature shift maneuvers without any shift quality concerns or potential park pawl loading interactions since the park pawl 27 is locked in an unloaded neutral state.

Figure 4:
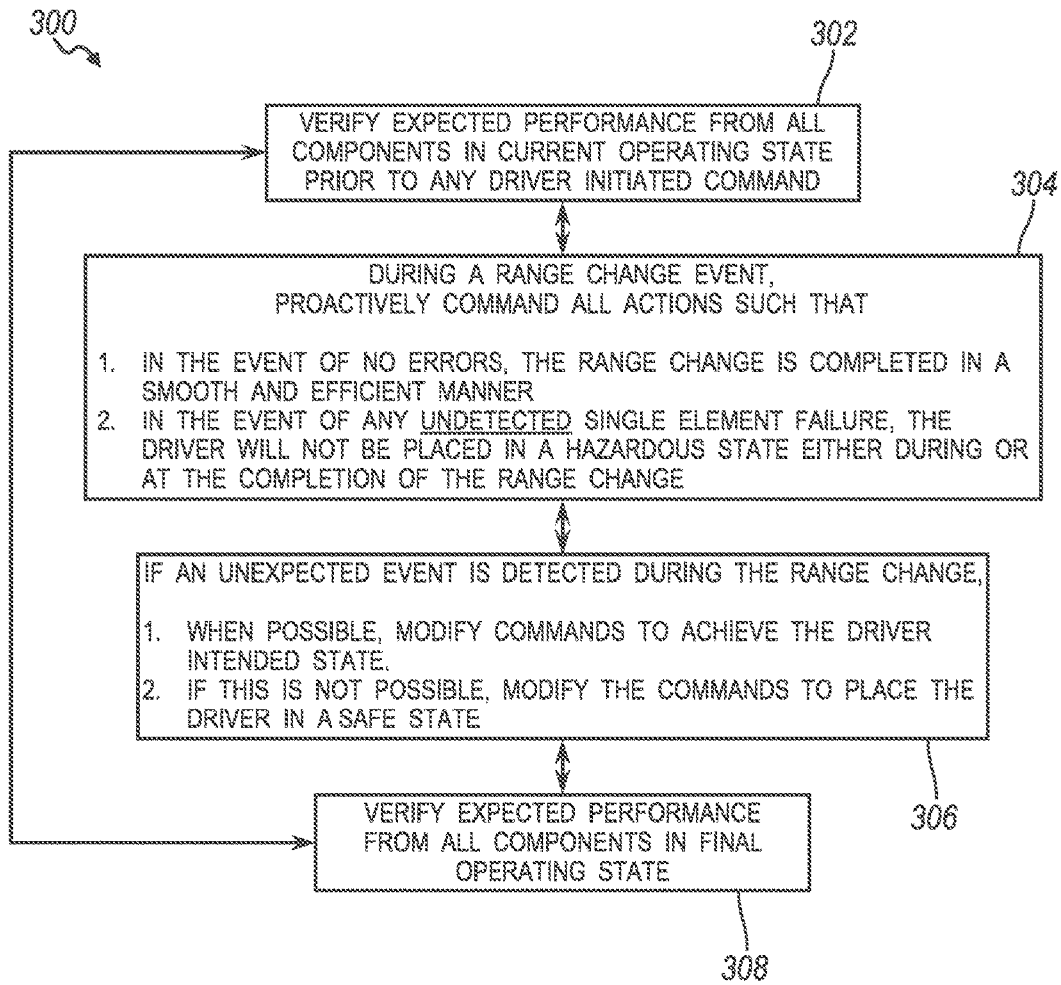
FIG. 4 illustrates a multi-layer protective strategy associated with the operation of the transmission illustrated in FIG. 1 in cold start environments.

Further, the process 200 provides a multi-layer protective strategy 300 as illustrated in FIG. 4. Without the locking of the grounding torque transmitting mechanisms as described above, the process 200 is still able to: verify expected performance from all components in a current operating state prior to any driver initiated command (layer 302); and verify expected performance from all components in a final operating state (layer 308). When the process 200 utilizes the locking of the grounding torque transmitting mechanisms, the process 200 further implements the additional features of layers 304 and 306, namely:

Layer 304: During a range change event, the process 200 proactively commands all actions such that 1.) In the event of no errors, the range change is completed in a smooth and efficient manner.

2.) In the event of any undetected single element failure, the driver will not be placed in a hazardous state either during or at the completion of the range change.

Layer 306: In an unexpected event is detected during the range change,

1.) When possible, the process 200 modifies the commands to achieve the driver intended state.

2.) If feature 1.) is not possible, the process 200 modifies the commands to place the driver in a safe state.

Note that the feature 2.) of layer 304 and features 1.) and 2.) of layer 306 considers all single element failures for their effect during a range change, and that these features ensure that commands are directed such that all hazard states are avoided during all conditions.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of operating a motor vehicle transmission, the method comprising:

measuring an operating temperature of the transmission, the transmission having at least seven torque transmitting mechanisms and at least three planetary gear sets, each planetary gear set having three gear members;

determining if the transmission is in a park mode;

determining if the operating temperature is below a predetermined threshold;

if the operating temperature is below the predetermined threshold and the transmission is the park mode, implementing a shift delay mitigation process including:

engaging a fourth torque transmitting mechanism and a fifth torque transmitting mechanism of the at least seven torque transmitting mechanisms so that they are locked to a ground to prevent a first gear member of the first planetary gear set from moving, the first gear member of the first planetary get set being coupled to an output drive shaft to prevent an input torque being transferred to a park pawl; and shifting the transmission out of the park mode.

2. The method of claim 1 wherein the first gear member of the first planetary gear set is coupled to a third gear member of the first planetary gear set, the third gear member being selectively coupled to the ground by the fourth torque transmitting mechanism.

3. The method of claim 2 wherein the fourth and fifth torque transmitting mechanisms are clutches.

4. The method of claim 3 wherein the fifth torque transmitting mechanism is a selectable one-way clutch.

5. The method of claim 2 wherein the output drive shaft is coupled to a first gear member of the second planetary gear set.

6. The method of claim 5 wherein the first gear member of the second planetary gear set is a ring gear.

7. The method of claim 5 wherein when the fifth torque transmitting mechanism is engaged, a second gear member of the second planetary gear set is coupled with a first gear member of the third planetary gear set.

8. The method of claim 7 wherein the second gear member of the second planetary gear set is a planet gear carrier and the first gear member of the third planetary gear set is a ring gear.

9. The method of claim 1 wherein the first gear member of the first planetary gear set is a ring gear.

10. A method of operating a motor vehicle transmission, the method comprising:

measuring an operating temperature of the transmission, the transmission having at least seven torque transmitting mechanisms and at least three planetary gear sets, each planetary gear set having three gear members;

determining if the transmission is in a park mode;

determining if the operating temperature is below a predetermined threshold;

if the operating temperature is below the predetermined threshold and the transmission is the park mode, implementing a shift delay mitigation process including:

engaging a fourth torque transmitting mechanism and a fifth torque transmitting mechanism of the at least seven torque transmitting mechanisms are so that they are locked to a ground to prevent a first gear member of the first planetary gear set from moving, the first gear member of the first planetary get set being coupled to an output drive shaft to prevent an input torque being transferred to a park pawl, the first gear member of the first planetary gear set being coupled to a third gear member of the first planetary gear set, the third gear member being selectively coupled to the ground by the fourth torque transmitting mechanism;

shifting the transmission out of the park mode;

determining if the transmission is out of the park mode; and if the transmission is out of the park mode, disengaging the fourth torque transmitting mechanism from the ground.

11. The method of claim 10 wherein the fourth and fifth torque transmitting mechanisms are clutches.

12. The method of claim 11 wherein the fifth torque transmitting mechanism is a selectable one-way clutch.

13. The method of claim 10 wherein the output drive shaft is coupled to a first gear member of the second planetary gear set.

14. The method of claim 13 wherein the first gear member of the second planetary gear set is a ring gear.

15. The method of claim 14 wherein when the fifth torque transmitting mechanism is engaged, a second gear member of the second planetary gear set is coupled with a first gear member of the third planetary gear set.

16. The method of claim 15 wherein the second gear member of the second planetary gear set is a planet gear carrier and the first gear member of the third planetary gear set is a ring gear.

17. The method of claim 10 wherein the first gear member of the first planetary gear set is a ring gear.

18. A method of operating a motor vehicle transmission, the method comprising:

measuring an operating temperature of the transmission, the transmission having at least seven clutches and at least three planetary gear sets, each planetary gear set having a ring gear, a planet gear carrier and a sun gear;

determining if the transmission is in a park mode;

determining if the operating temperature is below a predetermined threshold;

if the operating temperature is below the predetermined threshold and the transmission is the park mode, implementing a shift delay mitigation process including:

engaging a clutch and a selectable one-way clutch of the at least seven clutches so that they are locked to a ground to prevent the ring gear of the first planetary gear set from moving, the ring gear of the first planetary get set being coupled to an output drive shaft to prevent an input torque being transferred to a park pawl, the ring gear of the first planetary gear set being coupled to the sun gear of the first planetary gear set, the sun gear of the first planetary gear set being selectively coupled to the ground by the clutch;

shifting the transmission out of the park mode;

determining if the transmission is out of the park mode; and if the transmission is out of the park mode, disengaging the clutch from the ground.

* * * * *